United States Patent
Evans et al.

(10) Patent No.: US 9,619,387 B2
(45) Date of Patent: Apr. 11, 2017

(54) INVALIDATING STORED ADDRESS TRANSLATIONS

(71) Applicant: ARM LIMITED, Cambridge (GB)

(72) Inventors: Matthew L. Evans, Cambridge (GB); Hakan Lars-Goran Persson, Cambridge (GB); Jason Parker, Cambridge (GB); Gareth Stockwell, Cambridge (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 317 days.

(21) Appl. No.: 14/186,091

(22) Filed: Feb. 21, 2014

(65) Prior Publication Data

US 2015/0242319 A1    Aug. 27, 2015

(51) Int. Cl.
| | | |
|---|---|---|
| G06F 12/08 | (2006.01) | |
| G06F 12/10 | (2006.01) | |
| G06F 9/30 | (2006.01) | |
| G06F 12/0831 | (2016.01) | |
| G06F 12/1009 | (2016.01) | |

(Continued)

(52) U.S. Cl.
CPC ........ *G06F 12/0833* (2013.01); *G06F 9/3004* (2013.01); *G06F 12/1009* (2013.01); *G06F 12/109* (2013.01); *G06F 12/1027* (2013.01); *G06F 2212/1016* (2013.01); *G06F 2212/65* (2013.01); *G06F 2212/683* (2013.01)

(58) Field of Classification Search
CPC ............... G06F 12/0833; G06F 12/109; G06F 12/1009; G06F 9/3004; G06F 12/1027; G06F 2212/683; G06F 2212/65; G06F 12/08; G06F 12/10; G06F 9/30
See application file for complete search history.

(56) References Cited

U.S. PATENT DOCUMENTS

| | | |
|---|---|---|
| 4,885,680 A | 12/1989 | Anthony et al. |
| 5,317,710 A | 5/1994 | Ara et al. |

(Continued)

OTHER PUBLICATIONS

Webopedia, Virtual Machine, Dec. 12, 2002, pp. 1-1 https://web.archive.org/web/20021212145032/http://www.webopedia.com/TERM/V/virtual_machine.html.*

(Continued)

*Primary Examiner* — Christopher D Birkhimer
(74) *Attorney, Agent, or Firm* — Nixon & Vanderhye, P.C.

(57) ABSTRACT

A data processing apparatus and a method of processing data are disclosed, in which address translations between first addresses used in a first addressing system and second addresses used in a second addressing system are locally stored. Each stored address translation is stored with a corresponding identifier. In response to an invalidation command to perform an invalidation process on a selected stored address translation the selected stored address translation is invalidated, wherein the selected stored address translation is identified in the invalidation command by a specified first address and a specified identifier. The invalidation process is further configured by identifier grouping information which associates more than one identifier together as a group of identifiers, and the invalidation process is applied to all stored address translations which match the specified first address and which match any identifier in the group of identifiers to which the specified identifier belongs.

16 Claims, 9 Drawing Sheets

(51) Int. Cl.
  *G06F 12/109* (2016.01)
  *G06F 12/1027* (2016.01)

(56) References Cited

U.S. PATENT DOCUMENTS

| | | | |
|---|---|---|---|
| 5,574,878 A | 11/1996 | Onodera et al. | |
| 6,314,492 B1 | 11/2001 | Allen et al. | |
| 6,826,671 B2* | 11/2004 | Ostrovsky | G06F 12/109 |
| | | | 711/156 |
| 6,957,315 B2* | 10/2005 | Chauvel | G06F 1/206 |
| | | | 711/156 |
| 7,676,634 B1* | 3/2010 | Shar | G06F 9/30174 |
| | | | 711/118 |
| 7,734,892 B1 | 6/2010 | Rozas et al. | |
| 8,601,233 B2* | 12/2013 | Bennett | G06F 12/1009 |
| | | | 711/203 |
| 2003/0005230 A1 | 1/2003 | Solomon et al. | |
| 2006/0230223 A1 | 10/2006 | Kruger et al. | |
| 2007/0204130 A1 | 8/2007 | Hass et al. | |
| 2007/0250666 A1 | 10/2007 | Sartorius | |
| 2008/0301369 A1* | 12/2008 | Woffinden | G06F 9/3812 |
| | | | 711/125 |
| 2009/0216994 A1 | 8/2009 | Hsieh et al. | |
| 2010/0223447 A1* | 9/2010 | Serebrin | G06F 12/0253 |
| | | | 712/225 |
| 2013/0173882 A1 | 7/2013 | Bhowmik et al. | |
| 2013/0308641 A1* | 11/2013 | Ackley | H04L 45/7457 |
| | | | 370/392 |
| 2013/0332655 A1* | 12/2013 | Kandiraju | G06F 12/0246 |
| | | | 711/103 |
| 2014/0006681 A1* | 1/2014 | Chen | G06F 12/1027 |
| | | | 711/3 |

OTHER PUBLICATIONS

Kim et al., "Subspace Snooping: Filtering Snoops with Operating System Support", *Dept. of Computer Science, KAIST*, Sep. 2010, pp. 111-122.

Chang et al., "Lazy TLB Consistency for Large-Scale Multiprocessors", *Dept. of Computer Science, Seoul National University*, 1997, pp. 308-315.

International Search Report and Written Opinion of the International Searching Authority issued May 15, 2015 in PCT/GB2015/050282, 9 pages.

\* cited by examiner

LOOKUP
OR
INVALIDATE

| PAGE ADDRESS | ASID | VMID [15:0] | INVALIDATE WILDCARD [2:0] | ADDRESS TRANS$^N$/ PERMISSIONS |
|---|---|---|---|---|
| <A> | | VMID 4 | 001 | <C> <PERMISSIONS> |
| <B> | | VMID 5 | 000 | <D> <PERMISSIONS> |
| <A> | | VMID 5 | 001 | <C> <PERMISSIONS> |

FIG. 4A

INVALIDATE WILDCARD [2]   =   TOP / BOTTOM

INVALIDATE WILDCARD [1:0]   =   NUMBER OF BITS TO IGNORE FOR INVALIDATE MATCHING

=   00   →   IGNORE NOTHING (EXACT MATCH)

=   01   →   IGNORE 1 MSB/LSB ( AS SELECTED BY INVALIDATE WILDCARD [2])

=   10   →   IGNORE 2 ———— " ————

=   11   →   IGNORE ALL INVALIDATES THAT ARE BROADCAST

FIG. 4B

| PAGE ADDRESS | VMID | WILDCARD INVALIDATE | WILDCARD LOOKUP |
|---|---|---|---|
| E | 5 | 001 | 0 |

→ PERFORM LOOKUP FOR ADDRESS <E> / VMID 4; MISS IN TLB; PERFORM PAGE WALK; SAME ENTRY GENERATED (OTHER THAN VMID 4, BUT SAME VMID GROUP); UPDATE WILDCARD LOOKUP TO BE 1

| | | | |
|---|---|---|---|
| E | 5 | 001 | 1 |

→ NEXT LOOKUP FOR ADDRESS <E> / VMID 4 CAN ALSO HIT ON THIS ENTRY

FIG. 5A

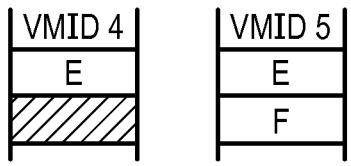

FIG. 5B

→ LOOKUP FOR ADDRESS <F> / VMID 5:

| | | | |
|---|---|---|---|
| F | 5 | 000 | 0 |

→ NO UPDATE MADE FOR SUBSEQUENT LOOKUP FOR ADDRESS <F> / VMID 4. ALWAYS MISS.

FIG. 5C

INVALIDATING STORED ADDRESS TRANSLATIONS

BACKGROUND OF THE INVENTION

Field of the Invention

The present invention relates to data processing. More particularly, this invention relates to the invalidation of stored address translations in address translation circuitry.

Description of the Prior Art

In a data processing apparatus which performs data processing operations with reference to data values stored in a memory, it is known to provide address translation circuitry which is configured to convert addresses of a first addressing system into addresses of a second addressing system. For example, this is the case where data processing circuitry (e.g. a CPU) of the data processing apparatus is configured to perform its data processing operations using virtual addresses, whilst the data values which are stored in a memory are referenced by the memory using physical addresses. Hence, in this example the address translation circuitry is configured to convert the virtual addresses into physical addresses. Given that some address translations may be repeatedly performed, it is further known to cache a set of address translations in storage provided in close association with the data processing circuitry to facilitate the performance of the address translation process and in particular to avoid the latency associated with retrieving address translation definitions from the memory. Such address translation circuitry is for example provided by a translation lookaside buffer (TLB).

Due to the fact that particular address translations are associated with particular sections of memory and therefore will typically have defined permissions associated with them such that the corresponding address translation can only be provided to a requester which is allowed to make the requested type of access to the specified memory address, it is further known that address translations can become invalid, for example after a context switch. A simple, yet blunt, technique for handling this situation is to flush all stored address translations that are locally stored (cached) in such situations so that any address translation that is requested thereafter must be determined with reference to a definitive reference source, such as a page table stored in memory, thus ensuring that the memory access permissions are correctly respected. However, this can result in rather inefficient usage of the local address translation storage (e.g. TLB) since the entire local storage content is deleted and therefore must be repopulated before the full benefit of having the local storage can be realised again.

It is also therefore known to configure such address translation circuitry to respond to an invalidation command which specifies a particular memory address and will cause any address translation circuitry in the data processing apparatus to invalidate a stored address translation corresponding to that address. Further, in order to allow the data processing circuitry to efficiently switch between contexts, or for example to host multiple virtual machines, it is also known to store an identifier (for example an address space identifier and/or a virtual machine identifier) in association with each locally stored address translation, such that any given address translation is only available to a requester which can provide a matching identifier. Accordingly, an invalidation command in such a data processing apparatus will also have a corresponding associated identifier, such that each process and/or virtual machine has control over the invalidation of its own stored address translations, but not over those of other processes/virtual machines.

SUMMARY OF THE INVENTION

Viewed from a first aspect, the present invention provides an apparatus for data processing, comprising data processing circuitry configured to perform data processing operations with reference to data values stored in a memory, wherein each data processing operation has an identifier associated therewith; and address translation circuitry configured to store address translations between first addresses used in a first addressing system corresponding to the data processing operations performed by the data processing circuitry and second addresses used in a second addressing system used by the memory, wherein each stored address translation is stored with a corresponding identifier, wherein the address translation circuitry is configured to respond to an invalidation command to perform an invalidation process on a selected stored address translation to invalidate the selected stored address translation, wherein the selected stored address translation is identified in the invalidation command by a specified first address and a specified identifier, and the address translation circuitry is further configured to perform the invalidation process further configured by identifier grouping information, wherein the identifier grouping information associates more than one identifier together as a group of identifiers, and the invalidation process is applied to all stored address translations which match the specified first address and which match any identifier in the group of identifiers to which the specified identifier belongs.

The inventors of the present invention have realised that advantageous flexibility in the invalidation of stored address translations in address translation circuitry may be provided by configuring the address translation circuitry to perform its invalidation process in further dependence on identifier grouping information. The invalidation process already depends on the address and identifier specified in the invalidation command. It should be noted that this identifier could take a number of forms, for example, the specified identifier may be a process identifier such as an address space identifier (ASID) and in this case the specified identifier is the ASID and the specified address represents an address to which the process identified by the ASID is seeking access. Alternatively, the identifier may for example correspond to a variety of host on which a process is running which is seeking access to the specified address. An example of this is where the specified identifier corresponds to a particular virtual machine being hosted by the data processing circuitry of the apparatus and thus where a process being executed by that virtual machine is seeking access to the specified address.

The address translation circuitry of the apparatus is configured to store address translations between addresses of a first addressing system and a second addressing system. These addressing systems could take a number of forms, for example being selected as appropriate from virtual addresses (e.g. such as are used in a CPU), guest physical addresses (i.e. intermediate physical addresses), and physical addresses (e.g. such as are used in memory). Thus, the address translation circuitry may be configured to provide address translation between virtual addresses and physical addresses, and this overall translation may itself comprise two stages, namely virtual to guest physical addresses and guest physical addresses to physical addresses. As such the first addresses used in a first addressing system referred to above could in these above-described examples correspond to either the virtual addresses or the guest physical addresses, since both correspond to the data processing operations performed by the data processing circuitry. The second addresses are those used in the second addressing system by the memory (i.e. physical memory addresses).

The flexibility provided by the present invention derives from the provision of the identifier grouping information. This identifier grouping information associates more than one identifier together as a group of identifiers and the address translation circuitry is configured to respond to the invalidation command not only to invalidate stored address translations which match the specified first address and specified identifier given by the invalidation command itself, but also to invalidate any further stored address translations which match the specified first address and match other identifiers in the group of identifiers to which the specified identifier (in the invalidation command) belongs.

The formation of the group of identifiers in this manner thus has the advantage that more than one address translation stored in the address translation circuitry can be invalidated in response to a single invalidation command. It should be noted that the invalidation command itself could come from a number of sources, for example from the data processing circuitry (acting as a master device for this slave address translation circuitry, as is the case for a CPU and a TLB respectively), or the invalidation command could be generated internally to the address translation circuitry (i.e. as a kind of housekeeping action).

The group of identifiers may therefore correspond for example to a group of address space identifiers (such as ASIDs) or, as another example, may correspond to a group of virtual machine identifiers. Configuring the address translation circuitry to perform the invalidation process on all stored address translations which match the first address specified in the invalidation command and which match any identifier in the group of identifiers thus means that the originator of any particular identifier (whether for example that is a particular process or virtual machine) can cause all stored address translations for a particular address (to which it has a legitimate access) to be invalidated for all of the group to which it belongs. Thus the present invention introduces an association between particular identifiers, and thus an association between the originators of those identifiers (e.g. processes or virtual machines) allowing those originators to be associated with one another in an advantageous manner as will be described in more detail below.

Furthermore, this configuration of the address translation circuitry enables a plurality of stored address translations to be invalidated quickly. This is for example to be compared to alternatives such as, in the context of address translations being stored in a TLB within a memory management unit (MMU), multiple address translation invalidations being carried out by software communication with the MMU via the hypervisor which maintains overall control of all running virtual machines, which could be considerably slower.

As mentioned above, the identifiers could take a number of forms, but in one embodiment the data processing circuitry is configured to host a plurality of virtual machines to perform the data processing operations and the corresponding identifier stored by the address translation circuitry in association with each address translation is a virtual machine identifier. Accordingly, in such an embodiment the identifier grouping information associates more than one virtual machine identifier together such that the invalidation process is applied to all stored address translations for the given first address and for any of the relevant group of virtual machine identifiers.

The identifier grouping information may be provided in a variety of different ways with different advantages associated with each. For example, in some embodiments the address translation circuitry is configured to store the identifier grouping information in association with each stored address translation. This enables a particular identifier group definition to be directly associated with each stored address translation and thus allows particular flexibility (on an entry-by-entry basis) in the configuration of these associations.

The identifier grouping information itself may take a variety of forms, but in some embodiments the identifier grouping information specifies a portion of the specified identifier in the invalidation command which is to be ignored when matching stored address translations for the invalidation process. Thus by ignoring a portion of the specified identifier a wildcard type matching procedure is provided, such that more than one identifier stored in the address translation circuitry can be matched against the specified identifier in the invalidation command. This arrangement furthermore has the advantage that identifying the portion of the specified identifier to be ignored need only require a very limited amount of information (for example identifying a limited number of bits of the specified identifier to ignore) and therefore this identifier grouping information can be provided without significant burden, in particular if the identifier grouping information is stored in association with each stored address translation (thus only requiring a small amount of additional space in the address translation circuitry). It should be noted that specifying a portion of the specified identifier to be ignored when matching stored address translations may logically be considered to be equivalent to specifying a portion of each stored identifier to ignore when matching against the specified identifier received and thus each of these equivalent definitions are contemplated here.

The identifier grouping information may specify the portion of the specified identifier to ignore in a number of ways, but in some embodiments the identifier grouping information specifies whether the portion of the specified identifier is a most significant portion or a least significant portion. Thus the identifier grouping information may for example specify a number of most significant bits of the specified identifier to ignore or conversely may specify a number of least significant bits of the specified identifier to ignore. There are particular advantages associated with each of these possibilities, for example ignoring the least significant portion of the specified identifier results in the group of identifiers being contiguous within the numbering scheme of the identifiers which may facilitate their logical association, but in other situations it may be preferable to ignore the most significant portion of the specified identifier, such that the identifiers associated together as a group are spaced out within the numbering system used for the identifiers and "mirrored" groups of identifiers can be supported.

In some embodiments the identifier grouping information is configurable to specify a no broadcast marker, such that the invalidation process is not performed for a stored address translation marked with the no broadcast marker in response to the invalidation command if the invalidation command is received as a broadcast invalidation command. Accordingly, this configuration provides an advantageous further feature which may be supported by such an arrangement that particular stored addressed translations can be "protected"

from invalidation as a result of a broadcast invalidation command, for example a distributed virtual memory invalidation broadcast initiated by a CPU and received by a peripheral device with its own MMU/TLB. In this situation the peripheral device will typically be provided with an additional interface via which the CPU can program the peripheral device and more generally to interact with the peripheral device and this additional interface can then be used to cause entries in the TLB to be invalidated.

Accordingly the identifier grouping information can be used in this particular configuration to identify that a particular stored address translation in the address translation circuitry should be protected from a broadcast invalidation process which the address translation circuitry seeks to carry out in response to the invalidation command. This provides an additional level of flexibility to the new configuration provided by the present invention, and whilst generally the identifier grouping information is used to allow more address translations to be invalidated in response to a particular invalidation command, this particular configuration allows specified address translations to be exempt from that extended invalidation process where it has been initiated by a broadcast invalidation command.

The identifier grouping information may however not be stored directly in association with each stored address translation and for example in some embodiments the apparatus is configured to store the identifier grouping information accessible to the address translation circuitry for application to all address invalidation processes performed by the address translation circuitry. Accordingly, this identifier grouping information can be stored centrally in a generally accessible manner to the address translation circuitry (i.e. this could be within the address translation circuitry itself or even more generally within the data processing apparatus) such that for any invalidation process performed by the address translation circuitry this general identifier grouping information is referred to. This reduces the storage space associated with storing this identifier grouping information.

In other embodiments the address translation circuitry is configured to identify the identifier grouping information within the invalidation command. Hence, the invalidation command itself may be extended to comprise the identifier grouping information, such that this identifier grouping information is provided on an invalidation command by invalidation command basis. This also saves storage space within the address translation circuitry and furthermore provides the originator of the invalidation command with the flexibility to define how the identifier grouping information is defined for each invalidation command.

In some such embodiments the data processing circuitry is configured to operate in one of two data processing modes, wherein in a first data processing mode the data processing circuitry is configured to issue the invalidation command without the identifier grouping information and the apparatus is configured to add the identifier grouping information to the invalidation command, and wherein in a second data processing mode the data processing circuitry is configured to issue the invalidation command and to add the identifier grouping information to the invalidation command itself.

These two data processing modes may take a number of forms, but may in particular correspond to operation at different levels of privilege within the data processing apparatus. As such the first data processing mode corresponds to a lower level of privilege where the invalidation command is issued by an originator (for example a process or virtual machine) which does not have sufficient privilege to define the identifier grouping information and thus the addition of this identifier grouping information to the invalidation command is handled by another part of the apparatus (i.e. a part of the apparatus which does have sufficient privilege to do this). For example in the context of a virtual machine embodiment in which the virtual machine issuing the invalidation command does not have sufficient privilege to define the identifier grouping information, this identifier grouping information may be added by a hypervisor which does have sufficient privilege. In other words in this example the hypervisor is operating in the second data processing mode and when issuing its own invalidation command therefore has sufficient privilege to add the identifier grouping information to the invalidation command itself.

In some embodiments the data processing circuitry comprises at least two data processing devices, wherein for each group of identifiers the address translation circuitry is configured to provide address translations for a first data processing device of the at least two data processing devices for only a first identifier of that group of identifiers and to provide an address translation for a second data processing device of the at least two data processing devices for any identifier of that group of identifiers.

Accordingly, the association of more than one identifier together as a group of identifiers by means of the identifier grouping information may be provided for the benefit of a particular (second) data processing device, whilst not being provided for another (first) data processing device. This also provides a mechanism by which different levels of privilege within the data processing apparatus may be supported, wherein only the second data processing device is provided with address translations for the full set of identifiers within a group of identifiers, whilst the first data processing device has no visibility of the association of a particular identifier with other identifiers in a group. Importantly therefore this means that the second data processing device can effectively share a first identifier with the first data processing device, whilst also having access to other identifiers in the specified group which are not accessible to the first data processing device. This may for example be enforced by an arrangement in which only the second data process device can issue invalidation commands with the full range of identifiers in the group of identifiers whilst the first data processing device is constrained to only be able to issue invalidation commands with the first identifier associated therewith.

In some embodiments the address translation circuitry is configured to perform a lookup process to determine if an address translation is stored for a received first address and a received identifier, and the address translation circuitry is configured to store a lookup match modifier in association with each stored address translation, and wherein when the lookup match modifier has a first value the lookup process is configured only to find the address translation if the received identifier fully matches a stored identifier, and when the lookup match modifier has a second value the lookup process is configured to find the address translation if the received identifier matches any identifier in a group of identifiers to which the stored identifier belongs as defined by identifier grouping information for the stored identifier.

Accordingly, the identifier grouping information, used to extend the invalidation process to more than one identifier in the group of identifiers, can also be used within the lookup process carried out by the address translation circuitry. This therefore means that a single address translation stored in the address translation circuitry can be used for responding to lookup requests associated with more than one identifier (where those identifiers form a group) and thus advantageously storage space within the address translation circuitry can be saved, because a specific address translation need not be stored in the address translation circuitry for each individual identifier of that group. The lookup match modifier enables this feature to be selectively enabled or disabled for a given stored address translation.

In some embodiments the address translation circuitry is configured, if no address translation is found as a result of the lookup process, to initiate a retrieval process to fetch the address translation from memory, and, if the lookup match modifier has the first value and the retrieval process shows that no address translation was found as the result of the lookup process because the received identifier did not match but the received identifier belongs to a group of identifiers to which a stored identifier in the address translation circuitry which does match also belongs, the address translation circuitry is further configured to change the lookup match modifier for the stored identifier to have the second value.

Accordingly, in the situation where no address translation is found as a result of the lookup process (for example where a TLB "miss" occurs) a retrieval process to fetch the address translation from memory can be initiated (e.g. a page table walk). If it is then found as a result of the retrieval process that the lookup process missed because the received identifier did not match, but a matching address translation is stored in the address translation circuitry for another identifier in a group of identifiers to which that received identifier belongs, and the retrieval process shows that the address translation fetched from memory otherwise matches the address translation stored for the stored identifier, then the address translation circuitry changes the lookup match modifier for the stored identifier to have a second value, such that a new entry in the address translation circuitry does not have to be made for the requested address translation which initiated the lookup process and further address translation requests relating to this address and received identifier can thereafter make use of the pre-existing matching entry. Thus storage space in the address translation circuitry is saved by avoiding the need for multiple address translations to be stored which differ only by their associated identifiers, when those identifiers belong to a group of identifiers.

In some embodiments the address translation circuitry is a translation lookaside buffer configured to store address translations for page tables in the first addressing system to page tables in the second addressing system.

In some embodiments the data processing circuitry comprises at least two data processing devices, wherein a first data processing device of the at least two data processing devices is a general purpose central processing unit and a second data processing device of the at least two data processing devices is a slave device configured to perform at least some of the data processing operations on behalf of the general purpose central processing unit.

Viewed from a second aspect the present invention provides a method of data processing comprising the steps of: performing data processing operations with reference to data values stored in a memory, wherein each data processing operation has an identifier associated therewith; storing address translations between first addresses used in a first addressing system corresponding to the data processing operations performed by the data processing circuitry and second addresses used in a second addressing system used by the memory, wherein each stored address translation is stored with a corresponding identifier; performing an invalidation process in response to an invalidation command on a selected stored address translation to invalidate the selected stored address translation, wherein the selected stored address translation is identified in the invalidation command by a specified first address and a specified identifier; and performing the invalidation process further configured by identifier grouping information, wherein the identifier grouping information associates more than one identifier together as a group of identifiers, and the invalidation process is applied to all stored address translations which match the specified first address and which match any identifier in the group of identifiers to which the specified identifier belongs.

Viewed from a third aspect the present invention provides apparatus for data processing comprising means for performing data processing operations with reference to data values stored in a memory, wherein each data processing operation has an identifier associated therewith; means for storing address translations between first addresses used in a first addressing system corresponding to the data processing operations performed by the data processing circuitry and second addresses used in a second addressing system used by the memory, wherein each stored address translation is stored with a corresponding identifier; means for performing an invalidation process in response to an invalidation command on a selected stored address translation to invalidate the selected stored address translation, wherein the selected stored address translation is identified in the invalidation command by a specified first address and a specified identifier; and means for performing the invalidation process further configured by identifier grouping information, wherein the identifier grouping information associates more than one identifier together as a group of identifiers, and the invalidation process is applied to all stored address translations which match the specified first address and which match any identifier in the group of identifiers to which the specified identifier belongs.

BRIEF DESCRIPTION OF THE DRAWINGS

The present invention will be described further, by way of example only, with reference to embodiments thereof as illustrated in the accompanying drawings, in which:

FIG. 4A shows example content of address translation circuitry in one embodiment;

FIG. 4B shows more detail of the definition of the invalidate wildcard information stored in the address translation circuitry of FIG. 4A;

FIGS. 5A-C illustrate the usage of wildcard lookup information in one embodiment;

DESCRIPTION OF THE PREFERRED EMBODIMENTS

Figure 1:
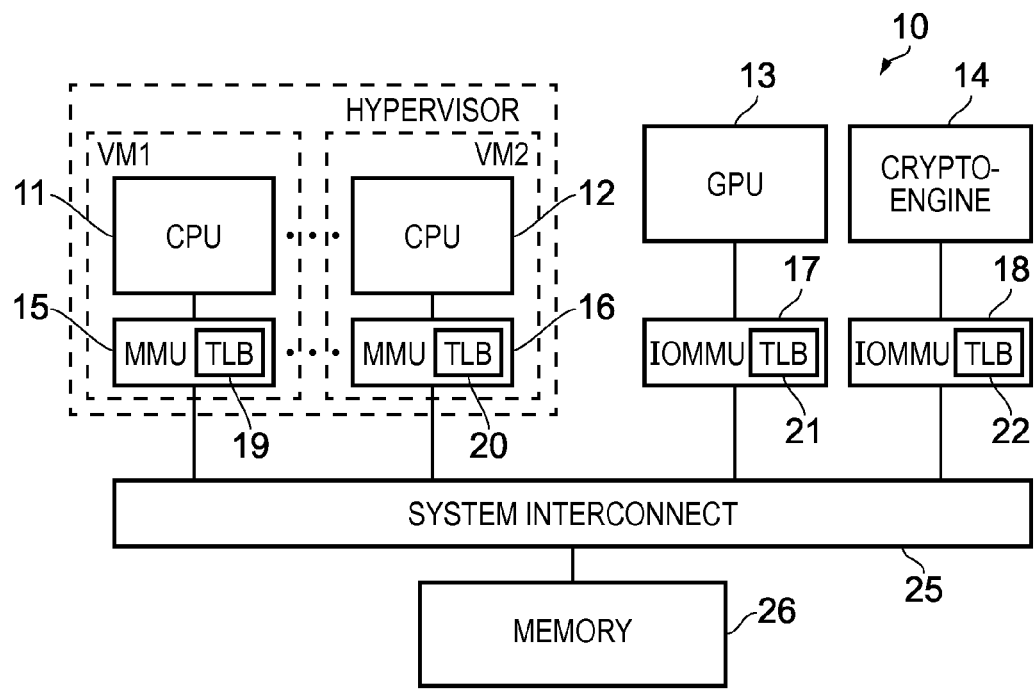
FIG. 1 schematically illustrates a data processing apparatus in one embodiment.

FIG. 1 schematically illustrates a data processing apparatus 10 in one embodiment. A data processing apparatus comprises CPU 11, CPU 12, GPU 13 and crypto-engine 14, which perform data processing operations with reference to data values stored in the memory 26. These data processing units access the data values stored in the memory 26 via system interconnect 25. In fact, more CPUs may be provided than the two CPUs 11 and 12 illustrated (as shown by the extension dots which span between them), but in the illustration of FIG. 1 only two CPUs are shown for clarity. Each of the data processing units 11-14 is configured to perform its data processing operations with reference to virtual memory addresses and each data processing unit is therefore provided with memory management unit 15-18 respectively (i.e. MMUs 15 and 16 for CPUs 11 and 12; and input-output MMUs (IOMMUs) 17 and 18 for GPU 13 and crypto-engine 14) which is configured to translate the virtual memory addresses used by the respective data processing unit into physical memory addresses used by the memory 26 with reference to page tables which are stored in the memory 26. In order to avoid the latency associated with the retrieval of a page table from memory 26, each MMU is provided with a translation lookaside buffer (TLB) 19-22, which is configured to cache a set of the most recently used address translations.

The data processing apparatus 10 is configured to host a number of virtual machines, these in particular being hosted by the CPUs 11, 12. As shown in FIG. 1, a particular virtual machine may be associated with a particular CPU (e.g. as shown VM1 with CPU 11 and VM2 with CPU 12) but other configurations are also possible, for example where a virtual machine is hosted by a number of CPUs. A hypervisor is also hosted by the CPUs, which in the illustrated example is hosted by all the CPUs in the data processing apparatus, although again this only represents one example configuration and the hypervisor might in other examples be hosted by fewer than all the CPUs provided. It will be recognised therefore that the CPUs 11 and 12 are general purpose data processing units, whilst the GPU 13 and crypto-engine 14 are more dedicated devices configured to carry out particular data processing tasks on behalf of the CPUs. For example, the GPU 13 may be provided to carry out particular graphics processing operations (e.g. video encoding and decoding) whilst the crypto-engine 14 can perform data decryption and encryption.

Figure 2:
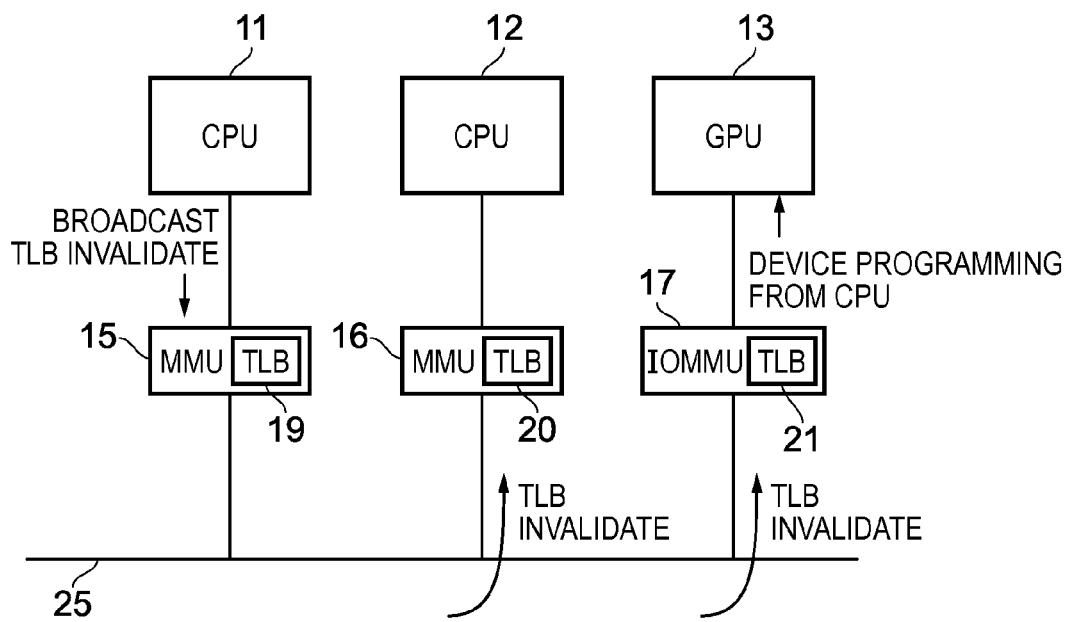
FIG. 2 schematically illustrates the broadcasting of a TLB invalidate command in one embodiment.

Generally speaking the entries in a given TLB are tagged with an identifier VMID which identifies the virtual machine associated with that TLB entry. This allows the switching between data processing operations of the various virtual machines being hosted by the data processing apparatus and hence switching between the page tables allocated to those virtual machines without requiring a flush of the TLBs. If a given CPU wishes to invalidate a TLB entry in its associated TLB, as illustrated in FIG. 2, that CPU 11 can broadcast a TLB invalidation instruction which specifies the virtual address (VA), an address space identifier (ASID) and the virtual machine identifier (VIVID) of the page to be invalidated. Thus the invalidation is address, ASID and VMID specific such that for example an invalidation of the page 0x12000 for ASID 3 in VMID 14 does not invalidate a page 0x12000 for ASID 3 in VMID 15.

The distributed nature of the memory system is reflected in the fact that not only is this TLB entry invalidated in the local TLB 19, but by broadcast across the system interconnect 25, any relevant TLB entries in other TLBs in the system (only TLBs 20 and 21 are shown for simplicity of illustration in FIG. 2) these are then also invalidated. Note that the GPU 13 is also shown in FIG. 2 as receiving programming commands from a CPU, these being received separately from the broadcast TLB invalidate instructions. This thus represents an additional interface via which the CPU can program the GPU and this additional interface can then be used by the CPU to cause entries in the TLB to be invalidated. This may be employed (as will be described in more detail below with reference to FIG. 4B) when entries in the GPU TLB are marked to be "immune" to broadcast invalidation commands.

Figure 3:
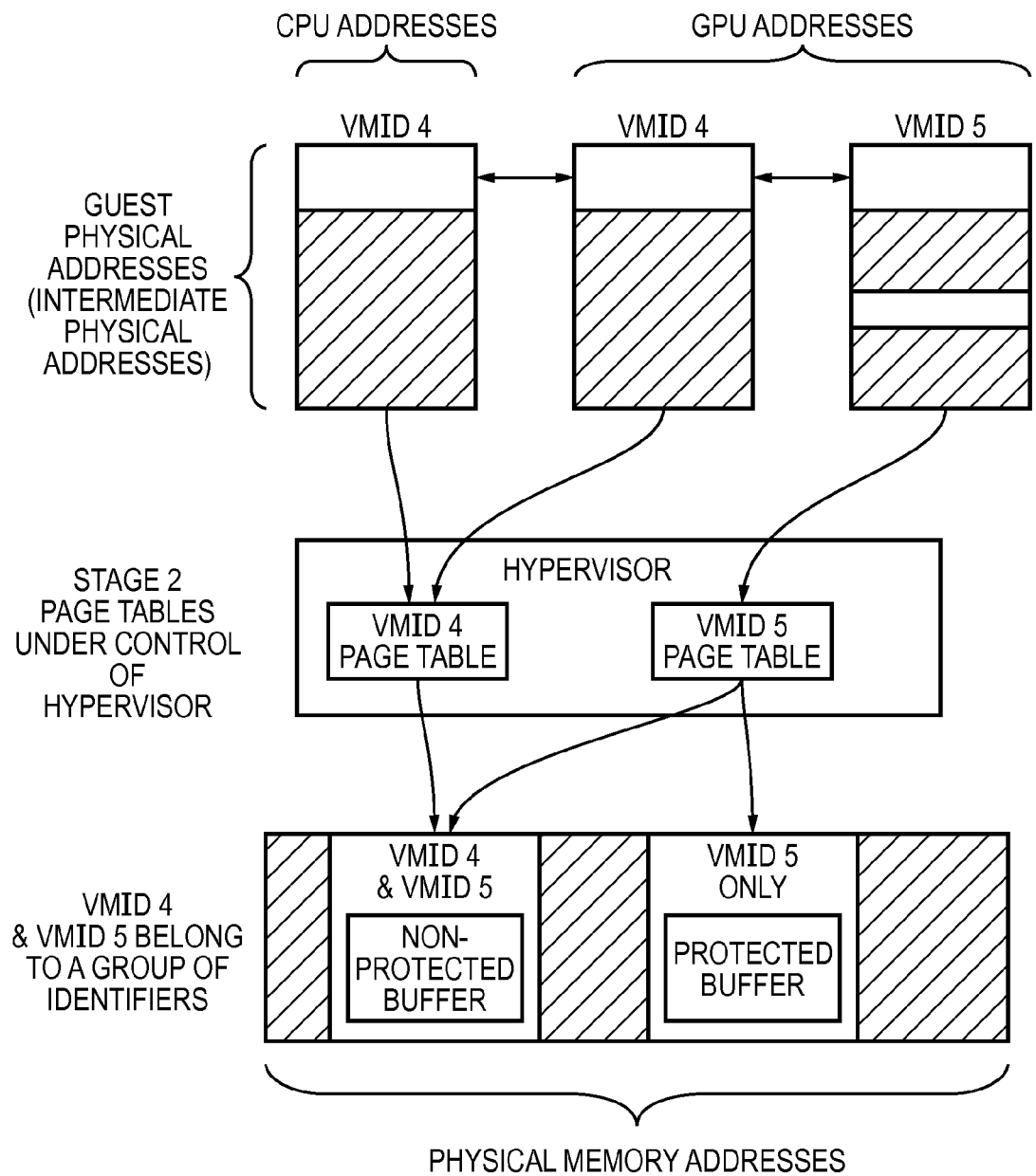
FIG. 3 schematically illustrates the mapping of a set of guest physical addresses used by a CPU and by a GPU into physical memory addresses used by a memory in one embodiment.

FIG. 3 presents a schematic overview of the translation of guest physical addresses (intermediate physical addresses) into physical memory addresses for address spaces visible to a particular virtual machine identifier in a CPU and for the corresponding virtual machine identifier and an associated virtual machine identifier (as will be explained in more detail below) in the GPU. The illustration of FIG. 3 is to be understood in particular in the context of a system in which different levels of privilege exist and correspondingly for which there are data stored in the memory which require protection from a less-privileged device in the system. In the example illustrated in FIG. 3, the GPU is a more-privileged device within the system, whilst the virtual machine hosted by the CPU (with the identifier VMID 4) is a less-privileged agent in the system. Note also that it is implicit in the illustration of FIG. 3 that the guest physical addresses will have been generated by translation of virtual addresses (using stage 1 page tables), though this is not illustrated for brevity.

The hypervisor is of course also a more-privileged agent in the system and is used to mediate access to protected pages in memory. Hence, the hypervisor can receive a request from the virtual machine to expose specific pages to the GPU for particular data processing tasks to be carried out with respect thereto. To do this the hypervisor makes a copy of the virtual machine's stage 2 page table for use by the GPU and then removes the specified pages from the virtual machine's own stage 2 page table. As a result these pages are then accessible (at their original memory addresses) to the GPU whilst being inaccessible to the originating virtual machine itself. The virtual machine software can then program the GPU with pointers into a buffer within these protected pages, submit jobs, and so on as normal except that the GPU can access the data contained in those locations.

Ordinarily, a device (such as GPU 13) assigned to a virtual machine could share the stage 2 address translations such that the device and the virtual machine view an identical guest physical address space. In this situation when a device MMU shares a virtual machine's CPU stage 2 page table, the MMU should associate the same VMID with its TLB entries created from the page table. This then means that a distributed virtual memory (DVM) TLB invalidate instruction from the CPU will match the device MMU TLB entries allowing these entries to be correctly invalidated at the same time as the entries in the CPU's own TLB. This is advantageous because DVM broadcast TLB invalidates can be much faster than the alternative of software communication with the device MMU through the hypervisor.

However, in the situation when a less-privileged virtual machine controls protected buffers given to a GPU, the CPU's MMU and GPU's MMU must use different stage 2 page tables to allow the GPU to access everything that the CPU can, but in addition to be able to access the protected buffers that have been removed from the CPU's view.

A problem arises where the virtual machine requires the GPU to simultaneously process two different blocks of data, one protected as described above (using different page table mappings to protect a buffer) and the other non-protected and sharing the virtual machine stage 2 page table. The data processing associated with the non protected buffer will have the virtual machine identifier (VMID 4 in the example of FIG. 3) assigned to the shared page table. However the protected buffer cannot be associated with the same VMID for a different page table (allowing access to the protected buffer) as doing so will cause some MMU implementations to break the protection by confusing mappings from the two different sources.

Accordingly, it is necessary for the protected data to be accessed by means of a different VMID, in order to ensure that the necessary page table mappings are correctly respected. However, according to prior art TLB invalidation techniques, this would require the above mentioned additional manual software invalidation of entries associated with the additional VMID, since it will not match the DVM broadcast TLB invalidation from the CPU for the original VMID. This can involve a hypervisor trap, decreasing performance.

The present techniques however address this problem by means of a modification to the MMU, which allows a single DVM broadcast TLB invalidation to be used to invalidate the entry for the VMID matching the originating virtual machine and the "secondary" VMID assigned within the device assigned to the virtual machine (i.e. in the example of FIG. 3 the GPU) thus increasing performance.

The modification introduced by the present techniques is that of a "wildcard" which allows the system hypervisor to allocate blocks of related VMIDs associated with a particular originating virtual machine. For example, this "wildcard" may be stored as a field in the TLB entries as is shown in the example configuration of FIG. 4A. Data processing tasks making use of these TLB entries (i.e. performing a lookup in this TLB for a given page address) match TLB entries against the page address and VMID exactly, so that the MMU can enforce the protection of two different page tables. However, an incoming DVM invalidate instruction can match against TLB entries using the wildcard, so that one invalidate can affect more than one VMID and both page tables. As an aside it should be noted that the TLB entries configured in FIG. 4A also comprise a address space identifier ASID and a received invalidate instruction can be configured to either be ASID specific or for the ASID value to be ignored for the purposes of the invalidation.

The invalidate wildcard field in the TLB entries shown in FIG. 4A is configured as set out in FIG. 4B. Hence as can been seen in FIG. 4B an upper bit of the invalidate wildcard field specifies whether the wildcard should be applied to the most significant bit(s) of the VMID value ("top") or to the least significant bit(s) of the VMID value ("bottom"). The lower two bits of the invalidate wildcard field then specify the number of bits in the VMID value which should be ignored. As shown, when this wildcard value is set to "00" then the "wildcarding" functionality is switched off and an exact match of the VMID value is required in response to an invalidate instruction. One or two bits of the VMID value may be ignored by specifying values of "01" and "10" respectively for the wildcard value. If the wildcarding is applied to the least significant bits of the VMID value then the hypervisor allocates associated VMIDs in contiguous pairs (e.g. as in the example in FIG. 4A of VMID 4 and VMID 5), or alternatively when the wildcard is applied to the most significant bits of the VMID value then this enables the hypervisor to allocate the VMID space divided into "mirrored" groups. For example with 16-bit VMIDs, a virtual machine could use VMID 0x300 and its protected device MMU data processing stream could use 0x8300. An additional configuration of the wildcard value of "11" is also provided which enables a particular TLB entry to be protected and immune to broadcast invalidate instructions. As mentioned above, this may for example be used to "protect" particular content of a TLB provided in the IOMMU of one of the peripheral data processing units (the GPU 13 or the crypto-engine 14 in the example of FIG. 1) such that this content can only be invalidated by a direct programming instruction received from a CPU over a separate interface, and not in response to broadcast invalidate instructions.

Hence this configuration allows a hypervisor to allocate a group of VMIDs for a given virtual machine, such that one VMID can be used for "normal" transactions initiated by the virtual machine (either directly from the CPU or via a device under the virtual machine's control), whilst the other VMIDs can be used for related data processing tasks which require protection. The number of "protected" VMIDs which can be additionally set up in this manner can then be varied in dependence on the size of the wildcard provided, but in the example of FIGS. 4A and 4B this can be seen to be a group of four VMIDs. Referring to the example entries shown in the TLB of FIG. 4A an incoming DVM invalidate specifying page address <A> and VMID4 would cause the first entry in table to be invalidated, however, so would an incoming DVM invalidate specifying page address <A> and VMID5 since the invalidate wildcard field associated with the first entry in the table indicates that one least significant bit of the VMID value should be ignored and therefore the invalidate instruction matches against the first entry in the TLB table whether the invalidate instruction specifies VMID4 or VMID5. Similarly the third entry in the TLB table shown in FIG. 4A would also be invalidated by either an incoming DVM invalidate instruction specifying page address <A> and VMID4 or VMID5, by virtue of the same invalidate wildcard value (001). Conversely the second entry in the TLB table shown in FIG. 4A can only be invalidated by a DVM invalidate instruction specifying page address <B> and VMID5, because the invalidate wildcard field indicates that an exact match is required.

A variant of the embodiment described with reference to FIGS. 4A and 4B is now described with reference to FIGS. 5A-5C. It will be recognised by a comparison of the first and third entries in the example TLB table of FIG. 4A that two TLB entries have been created for the same page address but with different VMIDs, namely the first and the third entries. In the context of the present invention, where VMID identifiers are grouped together, there are in fact situations where only one TLB entry is required and therefore more effective use of the TLB capacity can be provided. FIG. 5A shows an abbreviated version of the TLB entry shown in FIG. 4A, in which only fields for the page address, VMID value and wildcard invalidate field are shown. In this variant however an additional field within a TLB entry has been added, namely that of the "wildcard lookup". When this wildcard lookup value is zero then the "normal" fully matching TLB lookup behaviour results (i.e. where the VMID value and page address are required to exactly match). Accordingly, in the example shown in the upper part of FIG. 5A, where a lookup is performed for the incoming address <E> and for VMID4, this would miss in the TLB because the VMID value does not match. This then triggers a page table walk to retrieve the required translation from a page table in memory. As a result of this it is then determined in this embodiment that the entry generated is the same as the entry that already exists in the TLB, other than having VMID4 instead of VMID5 and that VMID4 and VMID5 belong to the same wildcarded group as defined by the wildcard invalidate field. In this situation the wildcard lookup value can then be updated to 1 which will relax the VMID match operation on lookup. Accordingly, when a further lookup is performed for address <E> and VMID4 this can also hit on this entry. An address space view corresponding to this situation is schematically illustrated in FIG. 5B which shows both VMID4 and VMID5 having access to an address E. However, note that VMID5 also additionally has access to an address F, to which VMID4 does not have access. Referring to FIG. 5C, the first time that a lookup is performed for this address F in association with VMID5 then this results in the illustrated TLB entry being generated for address F and VMID5 where the wildcard invalidate value is set to indicate an exact match, since this address belongs strictly only to VMID5 and there is no association with VMID4 for this address. Accordingly, if a subsequent lookup for address F and VMID4 is made then no updates to this entry will be made (i.e. the wildcard lookup value remains as zero and a lookup of address F and VMID4 will always miss against this entry).

Figure 6:
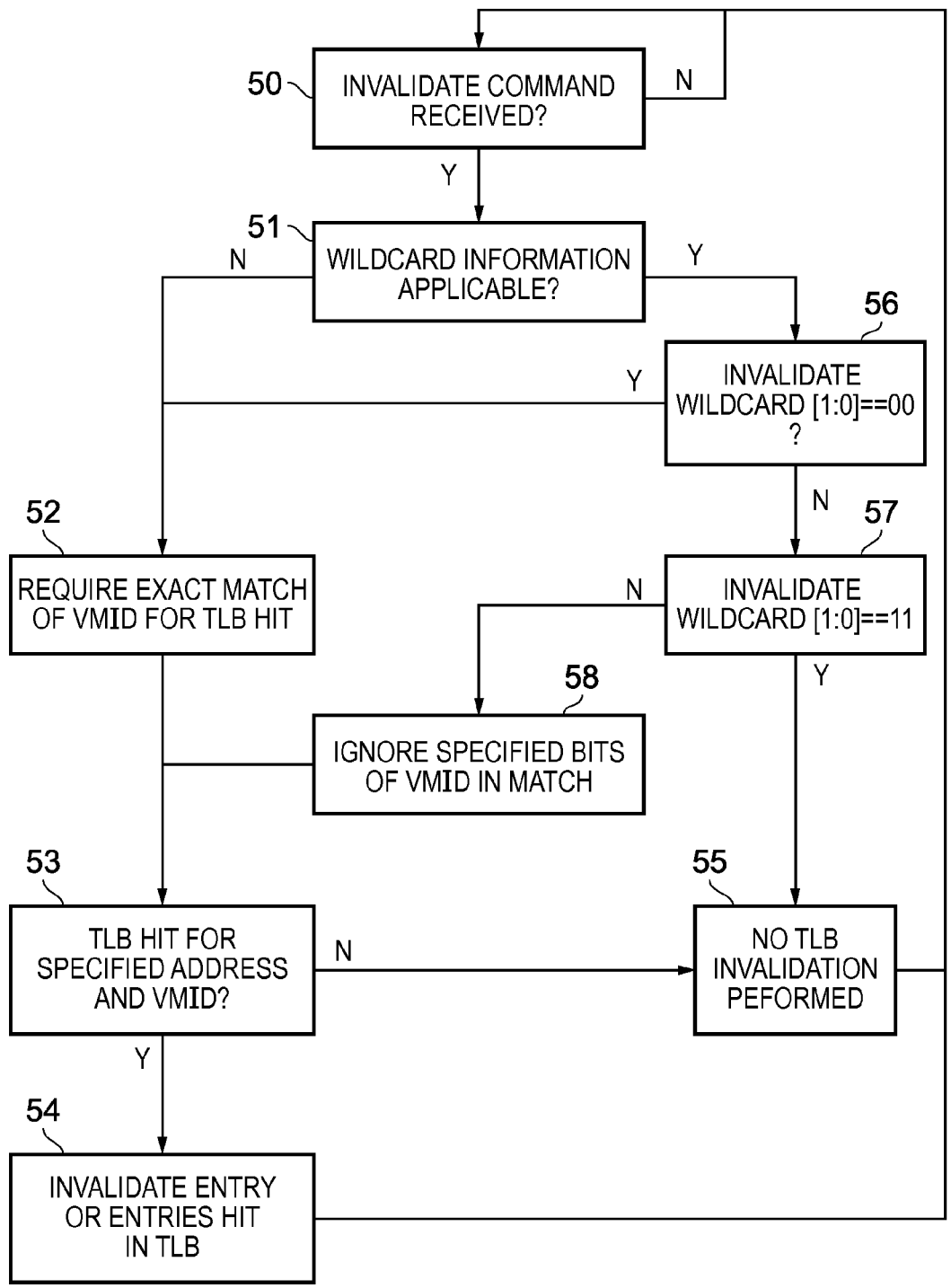
FIG. 6 schematically illustrates a series of steps which are taken by the apparatus in one embodiment.

FIG. 6 schematically illustrates a sequence of steps which are taken in the method of one embodiment when a broadcast invalidate command is received by an MMU. The flow begins at step 50 where the process waits until an invalidate command is received. When such an invalidate command is received then the flow proceeds to step 51 where it is determined if wildcard information is applicable. In other words it is determined if wildcard information is available to modify the manner in which the VMID value is matched (either stored in the TLB entry itself, as a global defined value or as a part of the invalidate command itself). If it is not then the flow proceeds to step 52 where an exact match of the VMID value is required for a TLB hit to result. Then at step 53 it is determined if a TLB hit has indeed resulted for the specified address and VMID value. If it has, then at step 54 the identified entry in the TLB is invalidated. The flow then returns to step 50 waiting for the next invalidate command to be received. If, however, at step 53 there is no TLB hit for the specified address and VMID value then the flow proceeds via step 55 (where no TLB invalidation is performed) to step 50.

If, however, at step 5lit is determined that wildcard information is applicable, then at step 56 it is determined if that wildcard information specifies "00", indicating that in fact an exact match of VMID is required and the flow proceeds as described above via step 52. If, however, this is not the case then at step 57 it is determined if the invalidate wildcard information specifies "11", indicating that a broadcast TLB invalidation should be ignored for this entry and the flow proceeds via step 55 and no TLB invalidation is performed. If, however, the invalidate wildcard information specifies "01" or "10" then the flow proceeds via step 58 where the specified bits of the VMID value are ignored (as defined in FIG. 4B) when determining if a match in the TLB has occurred and the flow continues to step 53 as described above.

Figure 7A:
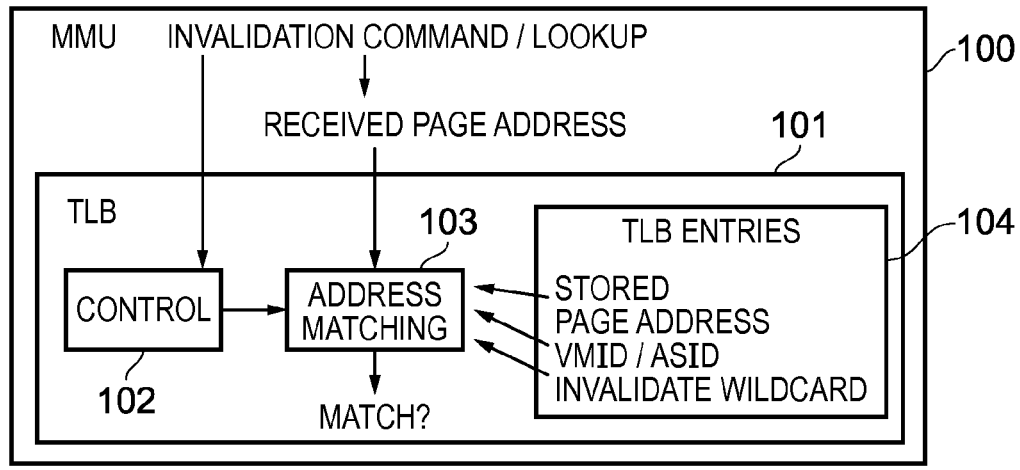
FIGS. 7A-C schematically illustrate three different embodiments with three different configurations of how invalidate wildcard information is provided.
Figure 7B:
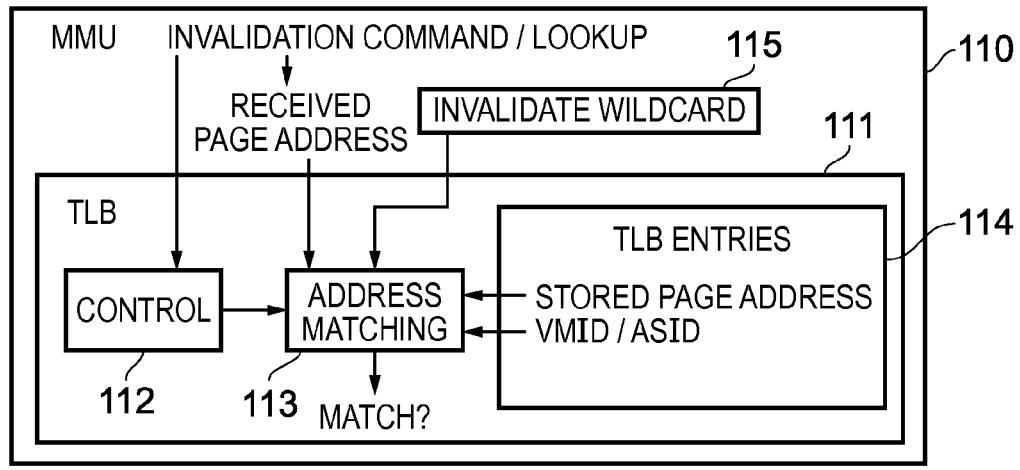
Figure 7C:
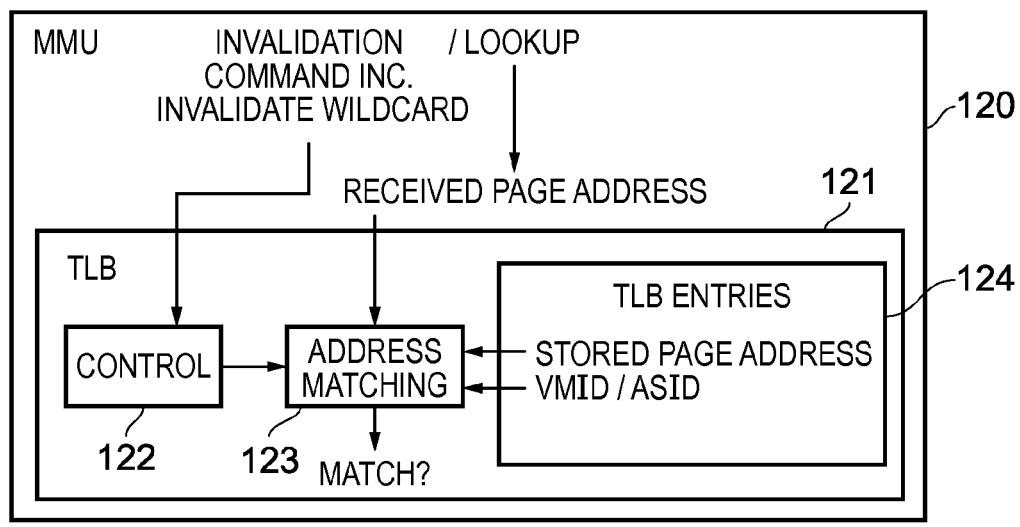

FIGS. 7A, 7B and 7C schematically illustrate three different MMU configurations showing different ways in which the invalidate wildcard information may be provided. The configuration shown in FIG. 7A corresponds to that described above with reference to FIG. 4A and FIGS. 5A-5C, wherein the invalidate wildcard information is individually stored in association with each TLB entry. In this embodiment, the control unit 102 of the TLB 101 in the MMU 100 identifies when an invalidation command has been received and controls the address matching circuitry 103 accordingly, such that the invalidate wildcard information retrieved from the TLB entries 104 should be used to modify the matching of the VMID received in the invalidation command against the VMID stored in the TLB entry. Conversely, when a lookup is performed within MMU 100 the control unit 102 controls the address matching circuitry 103 to require strict matching between the VMID received and that stored in the TLB entries 104. In the embodiment shown in FIG. 7B the MMU 110 is very similarly configured to the MMU 100 of FIG. 7A, except that the invalidate wildcard information is not stored in association with each individual entry in the TLB entries 114 of the TLB 111, but instead is defined in a globally accessible register 115 for use with respect to all invalidation commands received by MMU 110. Accordingly, in this embodiment when the control unit 112 identifies that a invalidation command has been received and configures the address matching circuitry 113 to make use of the invalidate wildcard information, the address matching circuitry 113 receives this invalidate wildcard information from the invalidate wildcard register 115, rather than in association with a particular TLB entry read out from the TLB entries 114. It should also be noted that although the globally accessible invalidate wildcard register 115 is illustrated as forming part of the MMU 110 in the embodiment of FIG. 7B, this is not necessary and for example the invalidate wildcard register 115 could be provided by the data processing apparatus at various other locations, for example so that it is more generally accessible for example to multiple MMUs. Finally, FIG. 7C schematically illustrates an MMU 120 which is configured to respond to an invalidation command which itself comprises the invalidate wildcard information as part of the command. Accordingly, in such an embodiment the control unit 122 of the TLB 121 is configured to identify both the fact that an invalidation command has been received and to derive the invalidate wildcard information from that invalidation command in order to configure the address matching circuitry 123 accordingly to make use of this when determining if a match has been found for the TLB entries 124.

It is worthwhile to note at this point that, as illustrated in FIGS. 7A-7C and described above, the address matching which determines whether a match has been found (i.e. a TLB hit) is performed on the basis of the VMID value, but may also be performed on the basis of the ASID value. In fact, as also mentioned above, in a variant on the embodiments explicitly described herein the ASID values may in fact be the "identifiers" which are grouped together and thus an invalidation command specifying one ASID value may be extended by the present techniques to apply to entries with different ASID values (but the same in other regards).

Figure 8:
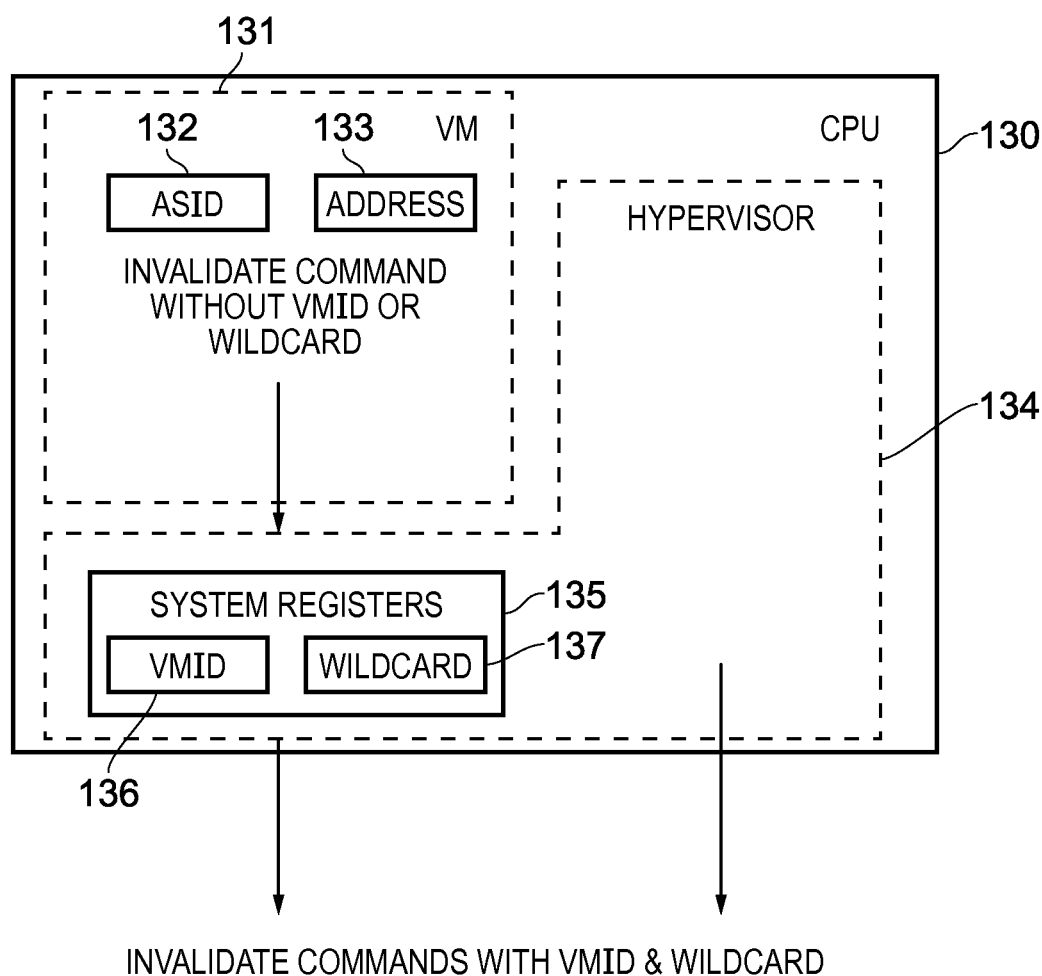
FIG. 8 schematically illustrates data processing circuitry in one embodiment in which a hypervisor is configured to add invalidate wildcard information to invalidation commands issued by a virtual machine.

FIG. 8 schematically illustrates a CPU 130 in relation to the generation of a TLB invalidate command with an associated VMID value and wildcard information (such as is received by the MMU 120 in the embodiment shown in FIG. 7C). The CPU 130 is hosting a virtual machine (VM) 131 and a hypervisor 134. In this embodiment the virtual machine 131 has knowledge of the particular address space identifier (ASID 132) which should be associated with a TLB invalidate command which it generates, as well as the address 133 which it wishes to invalidate, but does not itself append any virtual machine identifier (VMID) or wildcard information to the invalidate command, since this virtual machine is a less privileged component of the data processing system and instead the addition of this information is left to the privileged hypervisor 134. The hypervisor 134 holds VMID information 136 and wildcard information 137 in system registers 135 to which the virtual machine 131 does not have access and when a TLB invalidate command is generated by the virtual machine 131, the hypervisor 134 is configured to "intercept" this invalidate command and add the appropriate VMID information (to identify the originator as virtual machine 131) and appropriate wildcard information 137. This therefore maintains a higher level of security associated with the provision of the VMID and wildcard information.

Figure 9:
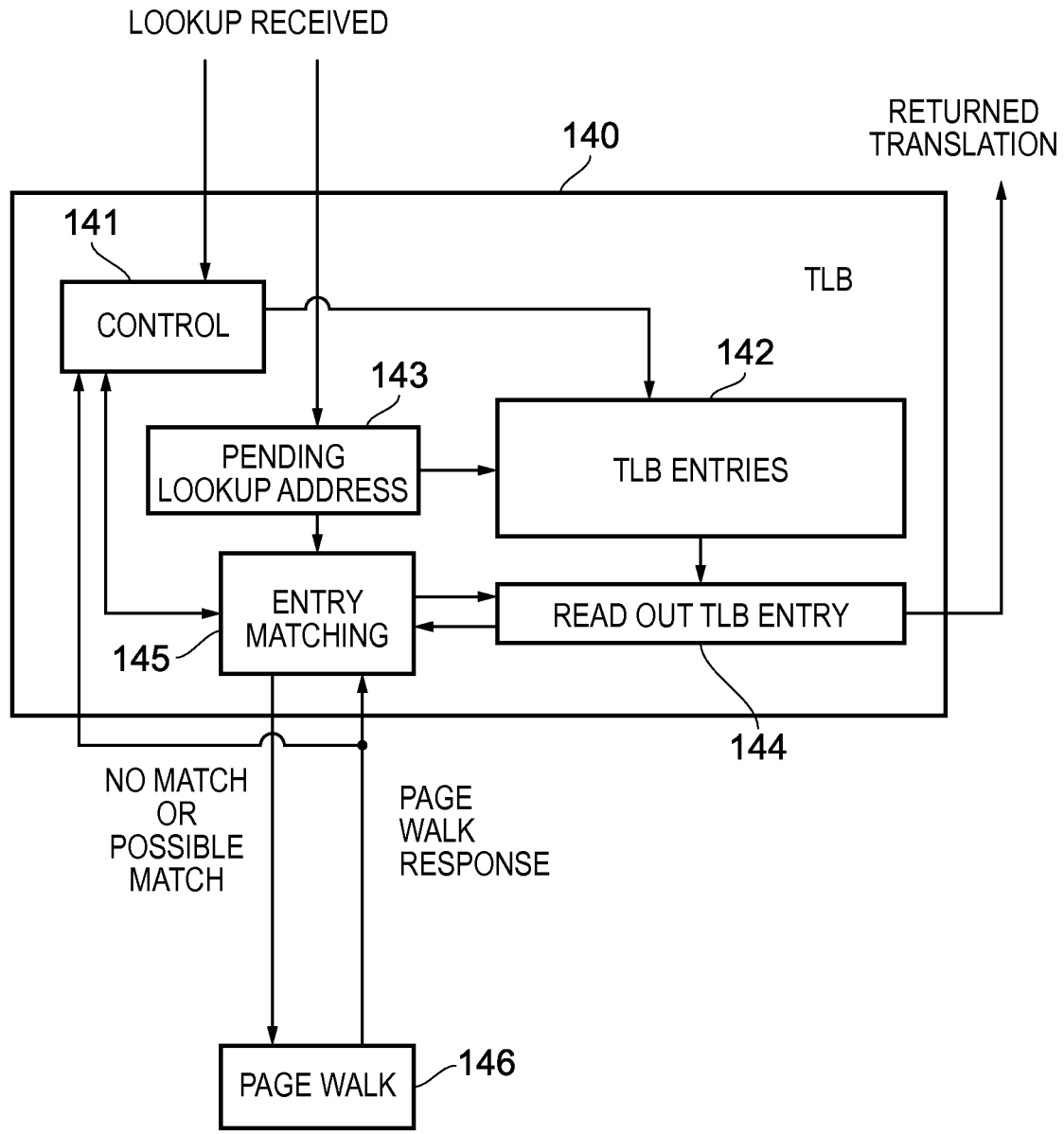
FIG. 9 schematically illustrates address translation circuitry in one embodiment.

FIG. 9 schematically illustrates the configuration of a TLB 140 in an embodiment which supports the functionality described above with respect to the embodiments of FIGS. 5A-5C. When a lookup request is received by the TLB 140, the control unit 141 is configured to initiate the lookup amongst the TLB entries 142 of the TLB 140. Here, for simplicity only a direct mapped TLB example is described, but one of ordinary skill in the art will also be familiar with set-associative TLB entry storage to which the present techniques may equally well be applied. However, in this direct mapped embodiment, the pending lookup address 143 is used to index into the TLB entries 142 and the identified TLB entry is then read out and temporarily held at 144. Entry matching logic 145 configured under control of the control unit 141 then determines if the requested lookup (page address, VMID and so on) matches with the read out TLB entry 144. If it does then this entry can simply be returned as the returned address translation. If the required match is however not established then a page table walk process 146 is initiated to retrieve the required address translation from page tables in memory. When the page table walk response returns, the control unit 141 controls the entry matching logic 145 to determine if in fact the entry returned from the page table walk response matches the read out TLB entry 144 other than the VMID value being different, but none the less belonging to the same VMID group i.e. these are associated VMID values by virtue of the wildcard information in the manner described above). This being the case then the control unit 141 is configured to update the wildcard lookup value stored in association with the read out TLB entry in the TLB entries 142 in the manner described above with reference to FIG. 5A. The read out TLB entry 144 is then also returned as the returned address translation. If however the page table walk response returns an entry which differs in any other way then this entry is caused to replace the TLB entry at the index identified by the pending lookup address 143, and the entry returned from the page table walk response itself is returned as the returned address translation.

Figure 10:
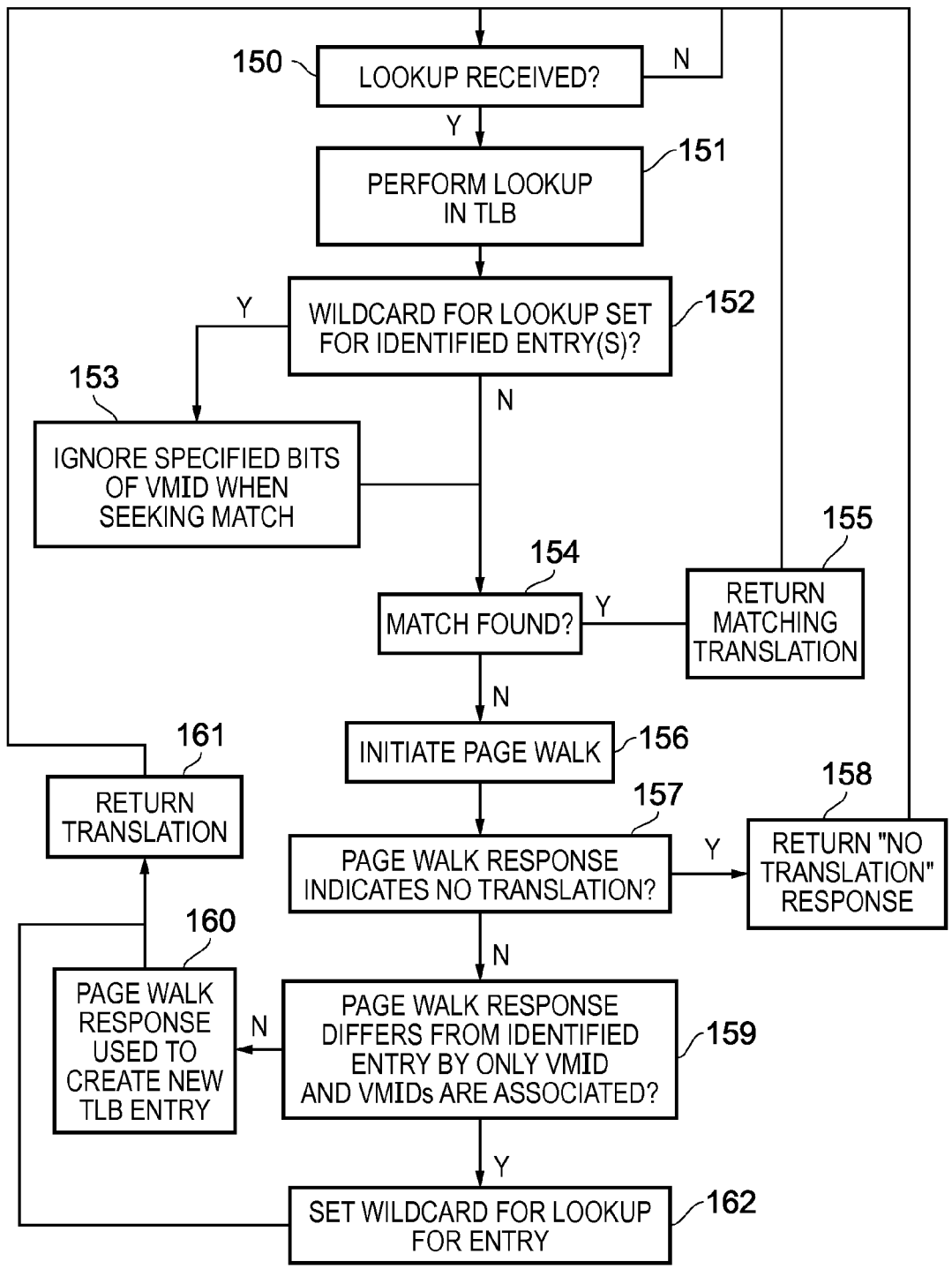
FIG. 10 schematically illustrates a sequence of steps which may be taken in the method of one embodiment.

FIG. 10 schematically illustrates a sequence of steps which are taken in the method of one embodiment when a lookup is received by a TLB. The flow begins at step 150 where the flow loops on itself until a lookup is received. The flow then proceeds to step 151 where the lookup in the TLB is performed. At step 152 it is then determined if the wildcard lookup flag has been set for the identified entry (or entries) in the TLB. If it has, then the flow proceeds via step 153 which configures the matching circuitry to ignore the specified bits of VMID when seeking a match for the lookup. It is then determined by the matching circuitry at step 154 if a match has been found between the read out TLB entry and the lookup requested. If a match is found then at step 155 the matching translation is returned and the flow returns to step 150.

If however a match is not found at step 154 then the flow proceeds to step 156 where a page table walk process is initiated. Then, at step 157 when the page table walk response is returned, it is determined if this indicates that no translation is available. This being the case then a corresponding "no translation" response is returned at step 158 and the flow returns to step 150. If however a translation is possible for the requested lookup then flow proceeds to step 159 where it is determined if the page table walk response differs from the read out TLB entry only by the VMID value and if the respective VMID values are associated with one another. If this is not the case then the flow proceeds via step 160 where the entry generated by the page table walk response is used to create a new TLB entry and at step 161 this is returned as the requested translation, the flow then returning to step 150. If however it is identified that the page table walk response has differed from the identified entry by only the VMID value and the VMIDs are associated with one another (i.e. they belong to a group), then the flow proceeds to step 162 where the wildcard flag lookup is set for the corresponding entry such that further lookup requests relating to either VMID value will be able to hit on the stored TLB entry. The flow then proceeds via step 161 where this entry is returned as the address translation and the flow proceeds to step 150.

In overall summary, the present techniques provide a data processing apparatus and a method of processing data, in which address translations between first addresses used in a first addressing system and second addresses used in a second addressing system are locally stored. Each stored address translation is stored with a corresponding identifier. In response to an invalidation command to perform an invalidation process on a selected stored address translation the selected stored address translation is invalidated, wherein the selected stored address translation is identified in the invalidation command by a specified first address and a specified identifier. The invalidation process is further configured by identifier grouping information which associates more than one identifier together as a group of identifiers, and the invalidation process is applied to all stored address translations which match the specified first address and which match any identifier in the group of identifiers to which the specified identifier belongs.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:
1. An apparatus for data processing, comprising:
data processing circuitry configured to perform data processing operations with reference to data values stored in a memory, wherein each data processing operation has an identifier associated therewith; and
address translation circuitry configured to store address translations between first addresses used in a first addressing system corresponding to the data processing operations performed by the data processing circuitry and second addresses used in a second addressing system used by the memory, wherein each stored address translation is stored with a corresponding identifier, wherein the address translation circuitry is configured to respond to an invalidation command to perform an invalidation process on a selected stored address translation to invalidate the selected stored address translation, wherein the selected stored address translation is identified in the invalidation command by a specified first address and a specified identifier, and the address translation circuitry is further configured to perform the invalidation process dependent on identifier grouping information, the specified identifier and the specified first address, wherein the identifier grouping information associates more than one identifier together as a group of identifiers comprising less than all identifiers, and the invalidation process is applied to all stored address translations which match the specified first address and which match any identifier in the group of identifiers to which the specified identifier belongs.

2. The apparatus as claimed in claim 1, wherein the data processing circuitry is configured to host a plurality of virtual machines to perform the data processing operations and the corresponding identifier stored by the address translation circuitry in association with each address translation is a virtual machine identifier.

3. The apparatus as claimed in claim 1, wherein the address translation circuitry is configured to store the identifier grouping information in association with each stored address translation.

4. The apparatus as claimed in claim 3, wherein the identifier grouping information specifies a portion of the specified identifier in the invalidation command which is to be ignored when matching stored address translations for the invalidation process.

5. The apparatus as claimed in claim 4, wherein the identifier grouping information specifies whether the portion of the specified identifier is a most significant portion or a least significant portion.

6. The apparatus as claimed in claim 3, wherein the identifier grouping information is configurable to specify a no broadcast marker, such that the invalidation process is not performed for a stored address translation marked with the no broadcast marker in response to the invalidation command if the invalidation command is received as a broadcast invalidation command.

7. The apparatus as claimed in claim 1, wherein the apparatus is configured to store the identifier grouping information accessible to the address translation circuitry for application to all address invalidation processes performed by the address translation circuitry.

8. The apparatus as claimed in claim 1, wherein the address translation circuitry is configured to identify the identifier grouping information within the invalidation command.

9. The apparatus as claimed in claim 8, wherein the data processing circuitry is configured to operate in one of two data processing modes, wherein in a first data processing mode the data processing circuitry is configured to issue the invalidation command without the identifier grouping information and the apparatus is configured to add the identifier grouping information to the invalidation command, and wherein in a second data processing mode the data processing circuitry is configured to issue the invalidation command and to add the identifier grouping information to the invalidation command itself.

10. The apparatus as claimed in claim 1, wherein the data processing circuitry comprises at least two data processing devices, wherein for each group of identifiers the address translation circuitry is configured to provide address translations for a first data processing device of the at least two data processing devices for only a first identifier of that group of identifiers and to provide an address translation for a second data processing device of the at least two data processing devices for any identifier of that group of identifiers.

11. The apparatus as claimed in claim 1, wherein the address translation circuitry is configured to perform a lookup process to determine if an address translation is stored for a received first address and a received identifier, and the address translation circuitry is configured to store a lookup match modifier in association with each stored address translation, and wherein when the lookup match modifier has a first value the lookup process is configured only to find the address translation if the received identifier fully matches a stored identifier, and when the lookup match modifier has a second value the lookup process is configured to find the address translation if the received identifier matches any identifier in a group of identifiers to which the stored identifier belongs as defined by identifier grouping information for the stored identifier.

12. The apparatus as claimed in claim 11, wherein the address translation circuitry is configured, if no address translation is found as a result of the lookup process, to initiate a retrieval process to fetch the address translation from memory, and, if the lookup match modifier has the first value and the retrieval process shows that no address translation was found as the result of the lookup process because the received identifier did not match but the received identifier belongs to a group of identifiers to which a stored identifier in the address translation circuitry which does match also belongs, and the retrieval process shows that the address translation fetched from memory otherwise matches the address translation stored for the stored identifier, the address translation circuitry is further configured to change the lookup match modifier for the stored identifier to have the second value.

13. The apparatus as claimed in claim 1, wherein the address translation circuitry is a translation lookaside buffer configured to store address translations for page tables in the first addressing system to page tables in the second addressing system.

14. The apparatus as claimed in claim 1, wherein the data processing circuitry comprises at least two data processing devices, wherein a first data processing device of the at least two data processing devices is a general purpose central processing unit and a second data processing device of the at least two data processing devices is a slave device configured to perform at least some of the data processing operations on behalf of the general purpose central processing unit.

15. A method of data processing comprising the steps of:
performing data processing operations with reference to data values stored in a memory, wherein each data processing operation has an identifier associated therewith;
storing address translations between first addresses used in a first addressing system corresponding to the data processing operations performed by data processing circuitry and second addresses used in a second addressing system used by the memory, wherein each stored address translation is stored with a corresponding identifier;

performing an invalidation process in response to an invalidation command on a selected stored address translation to invalidate the selected stored address translation, wherein the selected stored address translation is identified in the invalidation command by a specified first address and a specified identifier; and performing the invalidation process dependent on identifier grouping information, the specified identifier and the specified first address, wherein the identifier grouping information associates more than one identifier together as a group of identifiers comprising less than all identifiers, and the invalidation process is applied to all stored address translations which match the specified first address and which match any identifier in the group of identifiers to which the specified identifier belongs.

16. An apparatus for data processing comprising:

means for performing data processing operations with reference to data values stored in a memory, wherein each data processing operation has an identifier associated therewith;

means for storing address translations between first addresses used in a first addressing system corresponding to the data processing operations performed by the means for performing data processing operations and second addresses used in a second addressing system used by the memory, wherein each stored address translation is stored with a corresponding identifier;

means for performing an invalidation process in response to an invalidation command on a selected stored address translation to invalidate the selected stored address translation, wherein the selected stored address translation is identified in the invalidation command by a specified first address and a specified identifier; and means for performing the invalidation process dependent on identifier grouping information, the specified identifier and the specified first address, wherein the identifier grouping information associates more than one identifier together as a group of identifiers comprising less than all identifiers, and the invalidation process is applied to all stored address translations which match the specified first address and which match any identifier in the group of identifiers to which the specified identifier belongs.

* * * * *